United States Patent
Jeong et al.

(10) Patent No.: US 7,272,362 B2
(45) Date of Patent: Sep. 18, 2007

(54) MULTI-SECTOR IN-BUILDING REPEATER

(75) Inventors: Chang-Rae Jeong, Seoul (KR); Gui-Jung Lee, Gyeonggi-do (KR); Tae-Hoon Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 585 days.

(21) Appl. No.: 10/765,126

(22) Filed: Jan. 28, 2004

(65) Prior Publication Data

US 2004/0185794 A1    Sep. 23, 2004

(30) Foreign Application Priority Data

Jan. 30, 2003    (KR)    .................... 10-2003-0006149

(51) Int. Cl.
    *H04B 1/44*    (2006.01)
(52) U.S. Cl. .................. 455/78; 455/11.1; 455/14; 455/7; 455/16; 375/211; 375/212
(58) Field of Classification Search .............. 455/14, 455/11.1, 78, 7, 16, 12.1; 375/211, 212; 370/315
    See application file for complete search history.

(56) References Cited

U.S. PATENT DOCUMENTS

| | | | |
|---|---|---|---|
| 5,930,682 A * | 7/1999 | Schwartz et al. ............. | 455/14 |
| 5,946,622 A | 8/1999 | Bojeryd | |
| 6,032,020 A * | 2/2000 | Cook et al. ..................... | 455/7 |
| 6,052,558 A * | 4/2000 | Cook et al. ................ | 455/12.1 |
| 6,147,568 A * | 11/2000 | Souetinov ................. | 333/81 R |
| 6,374,119 B1 | 4/2002 | Jun et al. | |
| 6,501,942 B1 * | 12/2002 | Weissman et al. ............ | 455/14 |
| 6,704,298 B1 * | 3/2004 | Matsumiya et al. ........ | 370/315 |

FOREIGN PATENT DOCUMENTS

| | | |
|---|---|---|
| JP | 08-317461 | 11/1996 |
| WO | WO 01/33878 | 5/2001 |

OTHER PUBLICATIONS

Japanese Office action for Japanese Patent Application No. JP 2004-024821 dated Feb. 21, 2006.

* cited by examiner

*Primary Examiner*—Sanh D. Phu
(74) *Attorney, Agent, or Firm*—Robert E. Bushnell, Esq.

(57) ABSTRACT

A multi-sector in-building repeater, including: a master transmitting unit for receiving multi-sector signals of a carrier from a base station, mixing the multi-sector signals with different transmission intermediate frequency signals, and outputting mixed multi-sector signals to a same transmission line; a plurality of slave transmitting units for extracting sector signals assigned to the multi-sector signals from the master transmitting unit, converting extracted sector signals into high frequency signals, and transmitting converted high frequency signals through an antenna to a mobile terminal.

21 Claims, 6 Drawing Sheets

MULTI-SECTOR IN-BUILDING REPEATER

CLAIM OF PRIORITY

This application makes reference to and claims all benefits accruing under 35 U.S.C. § 119 from an application for MULTI-SECTOR IN-BUILDING REPEATER earlier filed in the Korean Intellectual Property Office on the 30$^{th}$ of Jan. 2003 and there duly assigned Serial No. 2003-6149.

BACKGROUND OF THE INVENTION

1. Field of the Invention

The present invention relates to an in-building repeater, and more particularly, to a process and a multi-sector in-building repeater, capable of maximizing transmission efficiency of by increasing frequency and sector.

2. Description of the Related Art

A widely spread personal communication system (PCS) is the general term for a next generation of mobile communication with client-centered service, which is intended to overcome defective service by mobile phones in a related art; in other words, PCS should provide an ideal communication service through which a person can talk over the phone with others anytime, anywhere, using an easy to carry terminal within an ultra-small and ultra-light appliance.

To implement principles of the personal communication system, it is necessary to allow a user wireless access while moving freely. In addition, a network service provider should help subscribers to make access more easily and provide customer-tailored service for new subscribers by building an intelligent network, whereby an originator and receiver, wherever they are, can have a conversation over the system.

The personal communication system provides a low-price pedestrian-centered mobile communication service. More specifically, its phone charge is relative to cheaper other mobile phones, users can hand-off communications while moving less than 20 km/hr, speech quality equivalent to wired phones is provided, and the mobile station of the system is easy to carry, cheap, ultra-small, and ultra-light.

Moreover, a base station for the personal communication system is usually a small, light micro-cell or pico-cell, and thus, can be easily installed in any place, freely making incoming/outgoing calls and accommodating many subscribers. Since the base station is designed to be very light and small, it can be set up in outdoor facilities like a utility pole or phone booth, minimizing an amount invested in installation.

In recent years, many personal communication service providers have introduced an in-building repeater for buildings in an urban area. Examples of prior art repeaters are set forth in the following reference incorporated by reference herein: U.S. Pat. No. 5,946,622 to Nils Johan Bojeryd entitled *METHOD AND APPARATUS FOR PROVIDING CELLULAR TELEPHONE SERVICE TO A MACRO-CELL AND PICO-CELL WITHIN A BUILDING USING SHARED EQUIPMENT* describes an apparatus and method for providing cellular telephone service to a pico-cell located within a building and extending cellular telephone service from a macro-cell located outside the building to a receiver inside the building; U.S. Pat. No. 6,374,119 to Ju-Sung Jun et al. entitled *SYSTEM AND METHOD FOR IN-BUILDING MOBILE COMMUNICATIONS* describes a system and method for mobile communications which remove blanket areas of communications using a mobile repeater.; and U.S. Pat. No. 6,501,942 to Haim Weissman et al. entitled *IN-BUILDING RADIO-FREQUENCY COVERAGE* describes a repeater apparatus for conveying a radio-frequency (RF) signal into an environment closed-off to the RF signal, including a master transceiver unit and one or more slave transceiver units, each unit positioned within the environment closed-off to the RF signal.

The following describes an in-building repeater of a related art, using CDMA (Code Division Multiple Access) mobile communication system as an example.

The in-building repeater as typical practiced in the related art may include such elements as antennas, duplexers, low noise amplifiers, preamplifiers, intermediate-frequency modules, surface acoustic wave (SAW) filters, mixers, and a power amplifier.

Operating principles of the in-building repeater are now explained below.

When a high frequency signal is received from a base station through, for example, through a Yagi antenna, the received signal is transmitted to a low noise amplifier in the transmission direction through a duplexer. Then the low noise amplifier and a preamplifier amplify the signal, and a intermediate-frequency (IF) module converts the amplified signal into an intermediate frequency signal. Next, a SAW filter removes noise from the signal that is output from the IF module, and a mixer converts the noise-free signal into a high frequency signal. The converted signal is amplified in a power amplifier, passed through another duplexer, and is then radiated through an in-building antenna.

On the other hand, a high frequency signal transmitted from a mobile station of a subscriber is received through the in-building antenna, passes through a duplexer, and is amplified by the low noise amplifier and preamplifier. This high frequency signal, having been amplified by the preamplifier, is converted into an IF signal in the IF module, and noise in the amplified is removed by the SAW filter. The noise-free signal is then converted into a high frequency signal through the mixer. The converted high frequency signal is amplified by the power amplifier, passed through another duplexer, and then is radiated from the Yagi antenna to be transmitted to the base station.

The in-building repeater using the Yagi antenna of the related art can be used however, only on a single floor or in a particular space in a building. To radiate the frequency wave to other floors, a leaky coaxial cable(LCX) is utilized, in an attempt to radiate the wave to every spot in the building.

Recently, according to related efforts in the art, an in-building repeater was installed in several floors of a building. When providing personal communication service to a mobile station, a high frequency wave (1.8 GHZ) is received through an Yagi antenna external to the in-building repeater, and the high frequency signal is then converted by a digital unit into a low frequency wave. Next, a distributor distributes the low frequency signal, and a remote access unit (RAU) in each service layer of the in-building repeater converts the distributed signal back to a PCS frequency, namely 1.8 GHZ, to make it appropriate for communication service.

The high frequency signal is not transmitted directly from the digital unit to the remote access unit, but is first converted into a low frequency wave at the digital unit before transmission, because when high frequency signals are transmitted between the digital unit and the remote access unit via wire, transmission loss often occurs and transmission of signals to a distant place becomes very difficult.

As such, a circuit for radiating low frequency signals between the digital unit and the remote access unit is called a repeater, and depending which type of medium is used between the digital unit and the remote access unit, the repeater selected maybe one of several kinds: RF(Radio Frequency) repeater used is only for amplifying signals without converting the signals, an optical dispersion repeater which uses optics, a micro repeater which uses microwaves, and a converting wave repeater which acts as a frequency converting repeater; usually, one of the first three types of repeater is used.

The structure of an in-building repeater using an light dispersion antenna may include duplexers, low noise amplifiers, mixers, filters, optical transmitters, optical receivers, an light dispersion antenna, and power amplifiers.

The operation of a repeater using a light dispersion antenna is similar to that of the previously described repeater, except that the high frequency signals in this system are converted into optical signals which are transmitted through optic cables and the optic signals are radiated to blanket the intended areas of reception through the light dispersion antenna.

Probably the most ideal cell design when the radio efficiency of the in-building repeater is taken into consideration, is an 1 FA (Frequency Assignment) Omni system, although an appropriate scheme for handover between public networks should be plotted out, this will not be discussed here because this scheme may be implemented by many alternative plans.

If there are so many service subscribers in the same building and thus, a number of sub-cells are needed, basically there could be two methods: one is to extend FAs and the other to increase sectors.

For instance, suppose that there is a twelve-story building. If the former method of extending FA is applied, a 12 FA omni service should be provided, and if the latter method of increasing sectors is applied, six sectors may be assigned for each FA by taking two floors of the building as one unit cell.

When extending FA, the number of repeaters at the far-end may be increased. Generally, the number of repeaters at the far-end is limited by the total output power. If a maximum of 10 mW is provided to one frequency, and there are a total of 12 frequency assignments, output of each FA is limited to between one and two mega-Watts. This means that many repeaters should be installed in the same space.

Another defect in the approach of extending FAs is that if a building is located in proximity to a public network service, the frequency being used is usually the same, raising the possibility that handover or disconnection will frequently occur.

When using the approach of increasing sectors, on the other hand, the sector structure at a base transceiver station (BTS) is basically more complex than the omni structure, its implementation involves great costs, and transmission loss is likely to happen because of interlayer handover.

Moreover, when an IF repeater is used, it is not simple to merge signals for six sectors. and transmit to each floor because the signal will be the same FA. Thus the signals have to be provided to each floor through different paths, respectively.

SUMMARY OF THE INVENTION

It is, therefore, an object of the present invention to provide multi-sector in-building transmission and reception process, and a repeater to maximize transmission efficiency, by increasing frequency and sector.

To achieve these and other objects, there is provided a multi-sector in-building transmission and reception process, and a repeater, that may be implemented with a master transmitting unit for receiving multi-sector signals of a carrier frequency from a base station, mixing the multi-sector signals with different transmission intermediate frequency signals, and outputting mixed multi-sector signals to a same transmission line; a plurality of slave receiving units for extracting sector signals assigned to the multi-sector signals from the master transmitting unit, converting extracted sector signals into high frequency signals, and transmitting converted high frequency signals through an antenna; a plurality of slave transmitting unit for mixing different receiving intermediate frequency signals with the sector signals of carrier frequencies from the antenna, converting mixed signals into multi-sector signals of different receiving intermediate frequency bands, and outputting converted sector signals to a same transmission line; a master receiving unit for mixing multi-sector signals at the plurality of slave transmitting units, the multi-sector signals that have been transmitted through the same transmission line from the plurality of slave transmitting units and converted into different receiving intermediate frequency band signals, with different intermediate frequency band signals, separating each of the sector signals, converting separated sector signals into receiving carrier frequency signals, and outputting converted signals to the base station. A master transmitting/receiving separator separates transmitted/received signals of the master transmitting unit from transmitted/received signals of the master receiving unit; and a distributor distributes the multi-sector signals received from the master transmitting unit to the plurality of salve receiving units, with the sector signals received being converted into intermediate frequency band signals from the plurality of slave transmitting units, and the converted sector signals transmitted to the master receiving unit.

The master transmitting unit may be constructed a plurality of mixing units for receiving assigned carrier frequency sector signals from the base station, mixing received sector signals with different transmission intermediate frequency signals to provide mixed sector signals; and a plurality of amplifying units for attenuating unnecessary signals output signals from the mixing units after the sector signals have been converted into different transmission intermediate frequency signals, for amplifying the sector signals without the presence of the unnecessary signals, to a predetermined magnitude, and for applying the amplified signals to a same transmission line.

Each of the mixing units may be constructed with an attenuator for receiving high frequency sector signals of an assigned carrier frequency from the base station, and attenuating received high frequency sector signals to provide attenuated high frequency sector signals; and a mixer for mixing the attenuated carrier frequency sector signals at the attenuator with signals having subtracted different transmission intermediate frequency band signals from the carrier frequency in order to provide the converted sector signals into the different transmission intermediate frequency band signals to each of the amplifying units.

Each of the amplifying unit may have a band-pass filter for attenuating converted sector signals into different transmission intermediate frequency band signals provided from the mixing units; and an amplifier to amplify filtered sector signals through the band-pass filter to a predetermined level in order to provide amplified sector signals to a transmission line.

The slave receiving unit may be implemented with a sector signal extracting unit for receiving the converted multi-sector signals into different transmission intermediate frequency signals provided from the master transmitting unit, mixing sector signals to be extracted from the received multi-sector signals with signals that have been reduced in magnitude by a predetermined value from the transmission intermediate frequency signals, and extracting sector signals; and a high frequency signal generating unit for converting extracted sector signals at the sector signal extracting unit into high frequency signals, and transmitting the converted signals through an antenna.

The sector signal extracting unit may be constructed with a first band-pass filter for filtering off multi-sector signals that have been converted to different transmission intermediate frequency signals provided by the master transmitting unit; a mixer for receiving filtered multi-sector signals from the first band-pass filter, mixing sector signals to be extracted from the multi-sector signals with signals which have been reduced in magnitude by a predetermined value from mixed transmission intermediate frequency signals in order to provide mixed signals; and a second band-pass filter for attenuating output signals from the mixer, and extracting a desired sector signal.

The high frequency signal generating unit may have a high frequency generator for generating high frequency signals by mixing sector signals extracted through the sector signal extracting unit with signals which have been reduced in magnitude by a predetermined value from the base station carrier frequency; and an amplifier for amplifying the power of the high frequency signals provided by the high frequency generator and then transmitting the amplified signals through an antenna.

The slave transmitting unit may include an intermediate frequency generating unit for generating intermediate frequency signals by mixing carrier frequency sector signals received provided through the antenna with the assigned receive intermediate frequency signals; and an amplifier for attenuating intermediate frequency signals generated by the intermediate frequency generating unit, and amplifying filtered intermediate frequency signals to a predetermined level.

The intermediate frequency generating unit may be constructed with an amplifier for amplifying carrier frequency sector signals provided through the antenna to a predetermined magnitude; a band-pass filter for filtering the carrier frequency sector signals amplified by the amplifier; and a mixer for mixing the filtered carrier frequency sector signals provided by the band-pass filter with signals intermediate frequency signals that have been separated from a receive carrier frequency.

The amplifying unit may have amplifier for amplifying intermediate frequency band sector signals provided by the intermediate frequency generating unit to a predetermined magnitude; and a band-pass filter for attenuating off amplified intermediate frequency band sector signals from the amplifier to enable transmission of the filtered signals to the master receiving unit.

The master receiving unit maybe constructed with a plurality of sector signal separating units for receiving converted multi-sector signals into different receive intermediate frequency band signals provided from the plurality of slave transmitting units, mixing the sector signals to be extracted with signals that have been reduced in magnitude by a predetermined value from the mixed receive intermediate frequency signals, and separating the sector signals to be extracted; and a plurality of high frequency generating units for receiving separated sector signals from the sector signal separating unit, mixing the separated sector signals with signals that have been reduced in magnitude by a predetermined value from a carrier frequency received, converting intermediate frequency band signals received into carrier frequency band signals in order to provide the converted signals to the base station.

The sector signal separating unit may be constructed with a mixer for receiving converted multi-sector signals into different intermediate frequency band signals provided from the plurality of slave transmitting units, for mixing sector signals to be extracted with signals that have been reduced in magnitude by a predetermined value from the mixed intermediate frequency signals received in order to provide mixed signals; and a band-pass filter for receiving the mixed signals from the mixer, performing band-pass filtering around the predetermined value, and separating the sector signals to be extracted.

The high frequency generating unit may have a mixer for receiving separated sector signals from the sector signal separating unit, mixing the sector signals with frequency signals that have been reduced in magnitude by a predetermined value from the carrier frequency received, converting intermediate frequency band signals received to receive carrier frequency band signals in order to provide converted signals; and an amplifier for amplifying the carrier frequency band signals from the mixer to a predetermined magnitude.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
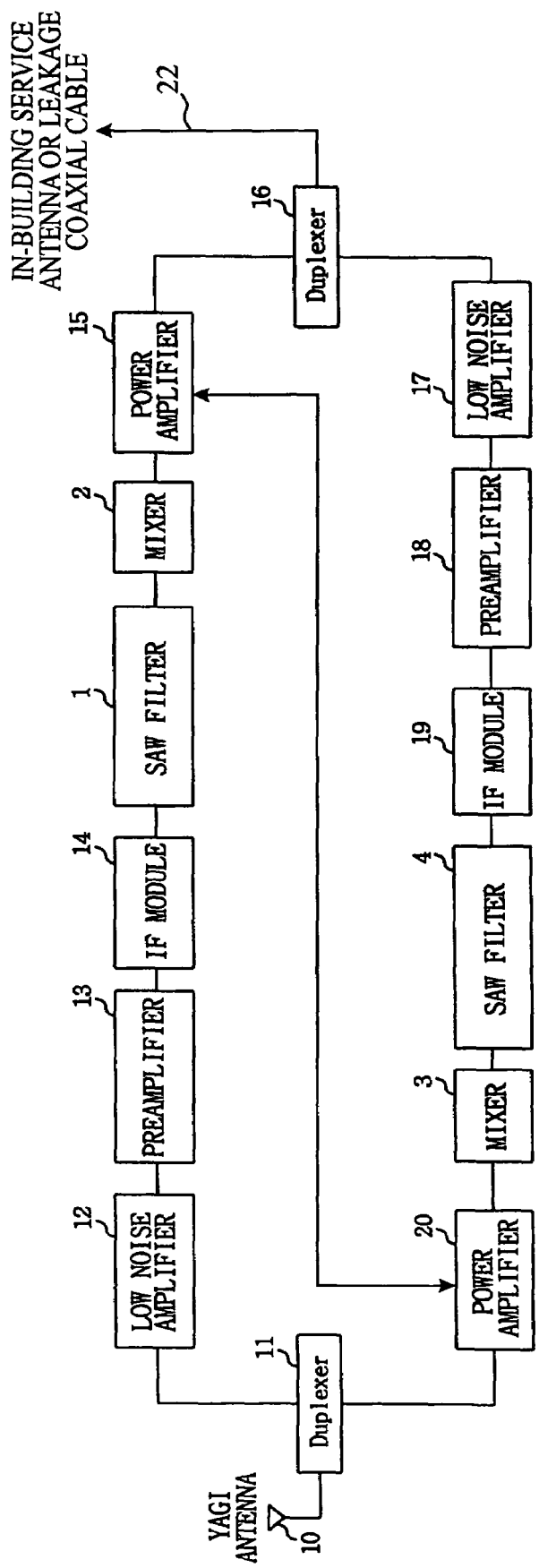
FIG. 1 is a block diagram schematic of an in-building repeater installed in one floor of a building according to a practice in the related art.

Turning now to the drawings, FIG. 1 is a structure diagram of an in-building repeater installed in one floor of a building using a CDMA (Code Division Multiple Access) mobile communication system as an example.

As shown in FIG. 1, the in-building repeater includes duplexers 11 and 16, low noise amplifiers 12 and 17, preamplifiers 13 and 18, intermediate-frequency modules 14 and 19, surface acoustic wave (SAW) filters 1 and 4, mixers 2 and 3, and power amplifier 15.

Operating principles of the in-building repeater with the above configuration are explained below.

When a high frequency signal is received from a base station through a Yagi antenna 10, the received signal is transmitted to the low noise amplifier 12 in the transmission direction through the duplexer 11.

Then, low noise amplifier 12 and preamplifier 13 amplify the signal, and intermediate-frequency (IF) module 14 converts the amplified signal into an intermediate frequency signal.

Next, SAW filter 1 removes noise in the signal from IF module 14, and mixer 2 converts the noise-free signal into a high frequency signal.

The converted signal is amplified in power amplifier 15, passed through duplexer 16, and is then radiated through an in-building antenna 22.

On the other hand, the high frequency signal transmitted from a mobile station of a subscriber is received through in-building antenna 22, passes through duplexer 16, and is amplified by low noise amplifier 17 and preamplifier 18.

This high frequency signal, having been amplified by preamplifier 18, is converted into an intermediate frequency signal in IF module 19, and noise therein is removed by SAW filter 4. The noise-free signal is then converted into a high frequency signal through mixer 3.

The converted high frequency signal is amplified by power amplifier 20, passed through duplexer 1, and then is radiated by antenna 10 for transmission to the base station.

The in-building repeater using the antenna for this circuit may only be used on a single floor or in a particular space in an architectural structure such as a building.

Therefore, to radiate the wave to the other floors of the building, a leaky coaxial cable(LCX) must be used in an effort to radiate the wave to every spot in the building.

Figure 2:
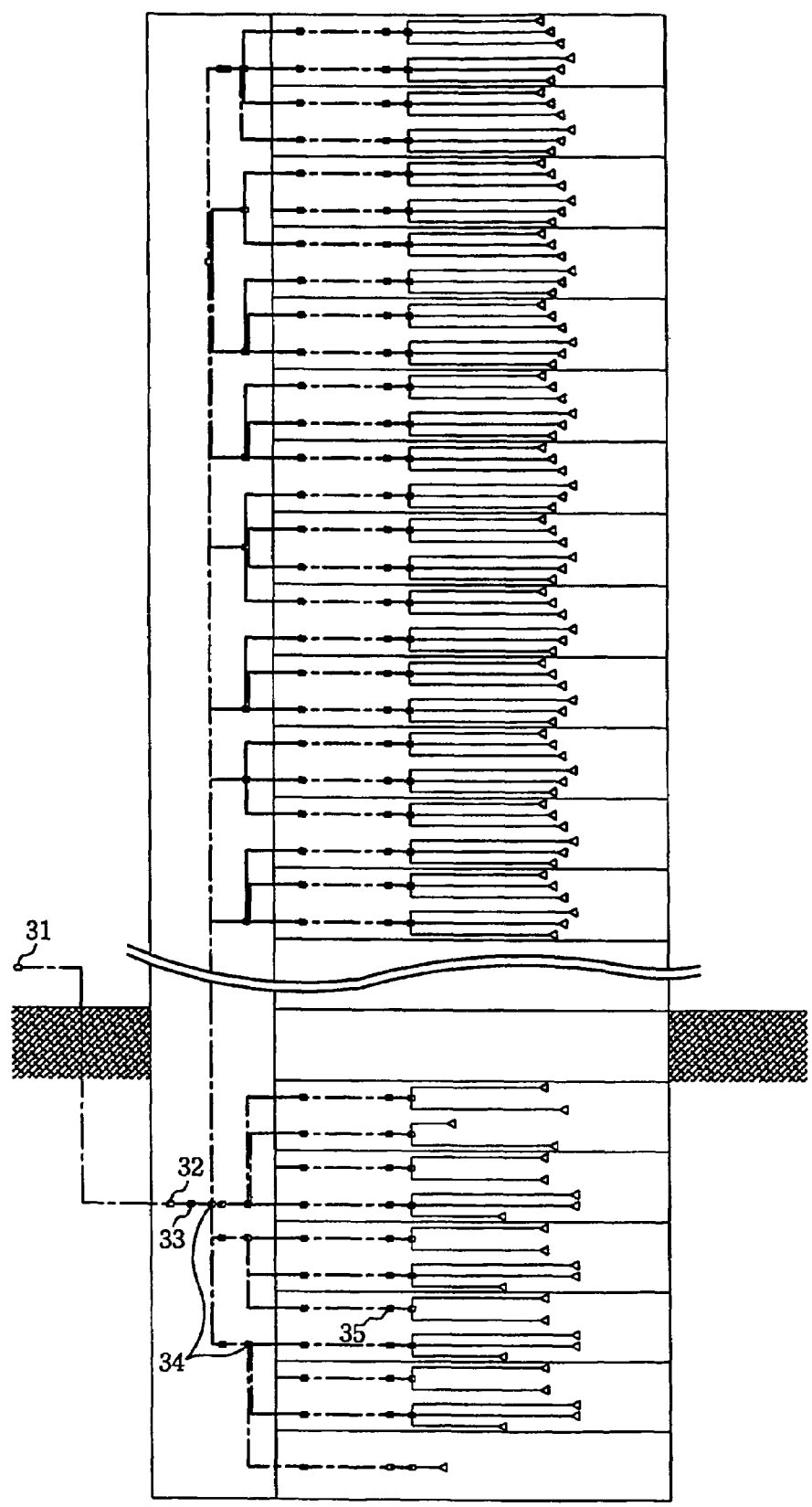
FIG. 2 is a longitudinal cross-sectional elevational view of an exemplary in-building installation of a repeater installed in several floors of an architectural structure.

FIG. 2 is an elevational cross-sectional view of an in-building repeater installed in several floors of a building. As depicted in FIG. 2, when providing personal communication service to a mobile station, a high frequency wave (1.8 GHZ) is received through exterior Yagi antenna 31 and the high frequency signal is converted into a low frequency wave at digital unit 33 through an IF repeater 32. Next, distributor 34 distributes the low frequency signal, and a remote access unit (RAU) 35 in each service layer converts the distributed signal back to a PCS frequency, namely 1.8 GHZ, to make the resulting signal appropriate for communication service.

The high frequency signal is not transmitted directly from digital unit 33 to the remote access unit 35, but is first converted into a low frequency wave at digital unit 33 before transmission because when high frequency signals are transmitted between digital unit 33 and remote access unit 35 via fixed wire, transmission losses occur and the transmission of signals to a distant location becomes very difficult.

As such, a circuit for radiating low frequency signals between digital unit 33 and remote access unit 35 is called a repeater, and depending which type of transmission medium is utilized between digital unit 33 and remote access unit 35, the repeater may be selected from several types: an RF(Radio Frequency) repeater which is suitable only for amplifying signals without conversion; an optical dispersion repeater which uses optics; a micro repeater which uses microwaves; and a converting wave repeater, that is, a frequency converting repeater. The first three types are usually used.

Figure 3:
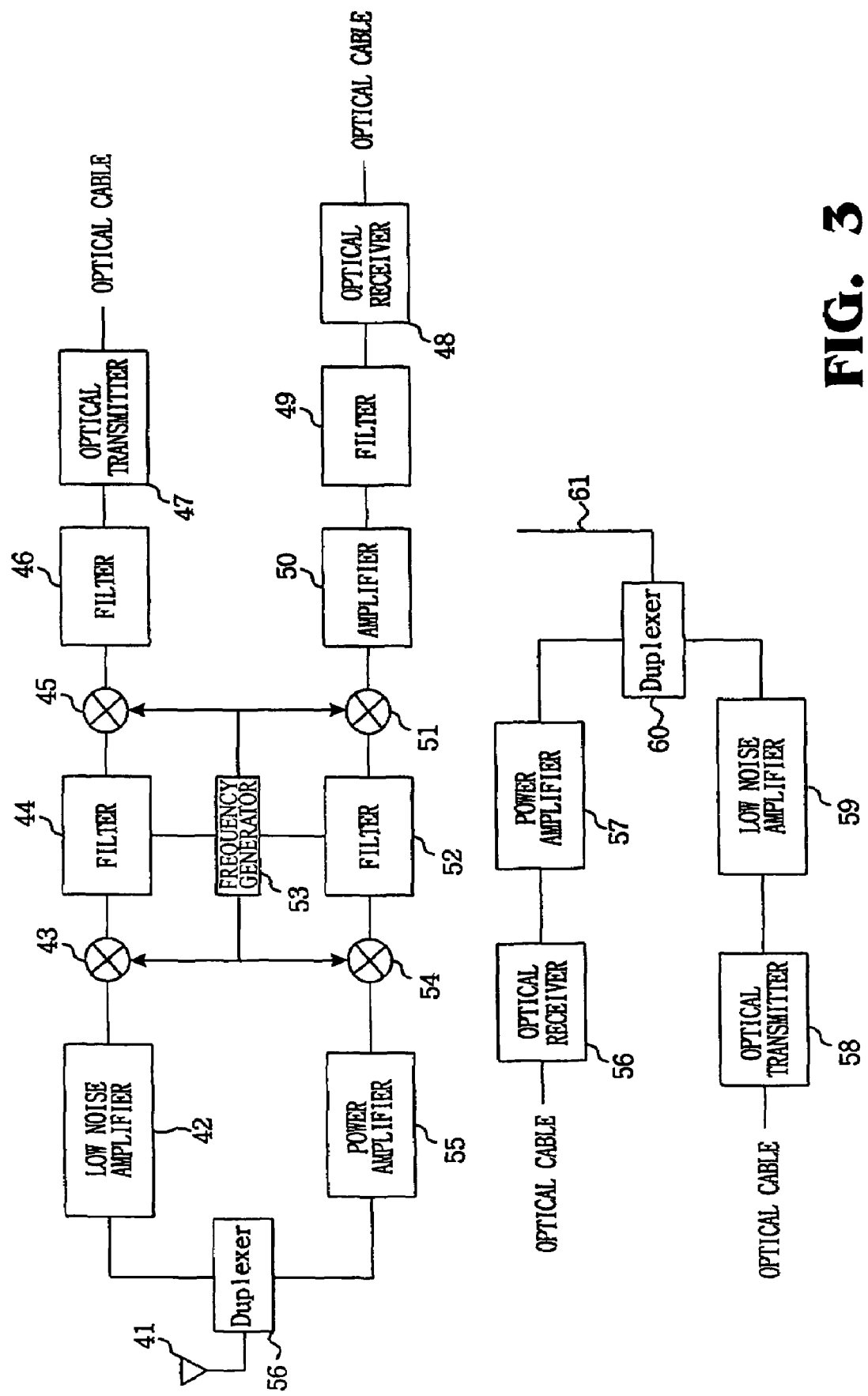
FIG. 3 is a block diagram schematic of an in-building repeater using an light dispersion antenna.

FIG. 3 is a schematic block diagram of an in-building repeater using an light dispersion antenna.

As shown in FIG. 3, the in-building repeater includes duplexers 56 and 60, low noise amplifiers 42 and 59, frequency generator 53, mixers 43, 45, 51 and 54, filters 44, 46, 49 and 52, optical transmitters 47 and 58, optical receivers 48 and 56, light dispersion antenna 61, and power amplifiers 55 and 57.

The operation of a repeater using a light dispersion antenna is similar to that of the previously described repeater, except that the high frequency signals in this system are converted into optical signals to be transmitted through optic cables and the optic signals are radiated to blanket the areas of reception by using the light dispersion antenna 61.

The circuits illustrated by FIGS. 1-3 are not an optimal system for reliable, readily receivable communications; further descriptions thereof are unnecessary.

The following detailed description will present a multi-sector system building repeater constructed as one embodiment of the principles of the present invention in conjunction with the accompanying drawings.

In general, two schemes are contemplated for increasing call capacity, depending on the configuration of base station equipment in CDMA (Code Division Multiple Access) base personal communication system. One scheme is to build a multi-sector base station and the other scheme is to increase frequency assignments.

Call capacity in the CDMA base personal communication system is limited by noise. If noise from a subscriber in another sector could be reduced by sectoring a base station antenna, the call capacity of the base station could be much increased.

A radiation pattern of the antenna is not, however, a 120-degree ideal pattern, but instead overlaps in the middle part, creating noise in the pattern of each other. Thus, if the antenna has three sectors, the BTS (base transceiver station) capacity is approximately 2.4 times that of an omni base station, and if the antenna has six sectors, the BTS capacity is approximately five times that of the omni base station's six sectors.

Usually a three-sector base station is used for a downtown area, while a two-sector base station is used for a country or rural area, and an omni base station is used for an area with less traffic. Although rare, a six-sector base station is also used to minimize a multi-FA (Frequency Assignment) hard handoff problem.

To increase BTS capacity, there is a need to increase not only the number of sectors, but also the carrier frequencies.

The carrier frequency used in CDMA is called FA (Frequency Assignment), and a multiple carrier frequency is called multi-FA.

This independently represents noise characteristic between frequencies. For example, capacity gain from the multi-FA is linearly proportional to the FA number.

When increasing the FA number, a frequency handoff problem that occurs during transmission to a sub-cell has to be solved at the same time because the multiple carrier frequency is different from FA number of a subbase station.

The above mentioned schemes can also be applied to an in-building repeater system, especially when there are so many service subscribers in one building and thus, subcells have to be provided, and the schemes used in the general CDMA base station, namely increasing FA and sector, will be useful for increasing capacity.

In addition, multi-FA/multi-sector, that is, using a plurality of FAs, each FA having a plurality of sectors, is also be another option.

As discussed above, the repeater at the far end is limited by total output power, so maximum power that can be provided to a frequency is also limited. This causes a problem because of the number of repeaters that have to be installed in the same limited space.

Moreover, the structure of a multi-sector BTS is basically more complex than the omni BTS, the implementation of a multi-sector BTS involves great costs, and transmission loss is likely to occur because of inter layer handover.

As such, the present invention introduces a novel multi-FA/multi-sector in-building repeater system. The following describe details a 1-FA/multi-sector in-building repeater system first.

Figure 4:
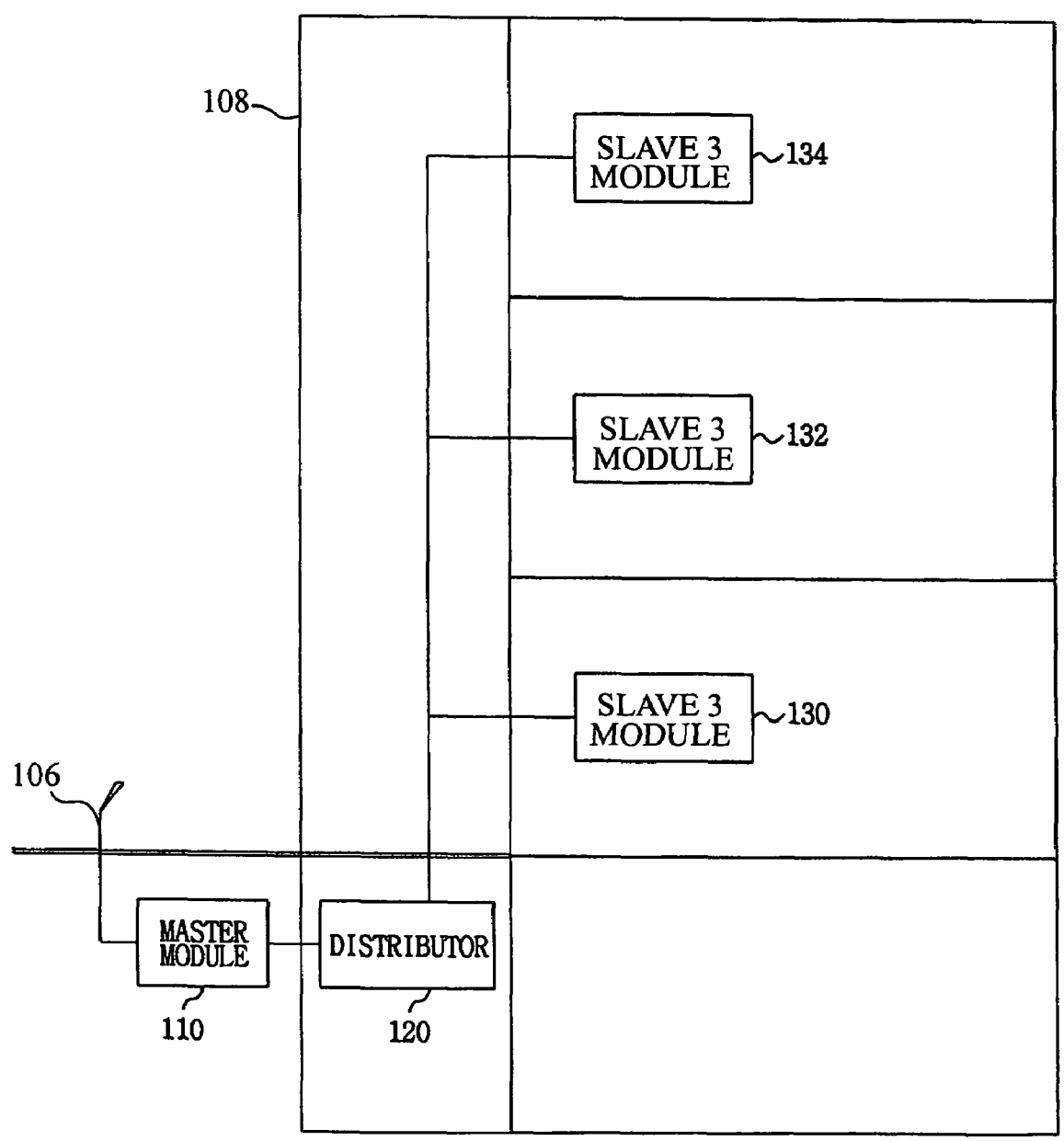
FIG. 4 is a structure diagram schematic of an 1-FA/3-sector in-building repeater constructed as one embodiment of the principles of the present invention.

FIG. 4 is a schematic block diagram of a 1-FA/3-sector in-building repeater system according to the principles of the present invention, shown in an elevational view as installed in an architectual structure such as a multi-story building.

As shown in FIG. 4, the 1-FA/3-sector in-building repeater system includes a master module 10 which may be sited below the grade level of the building for receiving frequency signals of the 1-FA/3-sector in-building repeater system via an outdoors antenna 106 that is located above grade, converting the signals received into intermediate frequencies, and performing frequency modulation on 3-sector signals to distinguish the modulated signals different from the mean frequency, a distributor 120 for distributing output signals from master module 110 to each slave module 130, 132, and 134, and a plurality of slave modules 130, 132, and 134 which receive the master module signals from the distributor 120 and extracting sector signals respectively assigned thereto.

In general, the master module 110 and distributor 120 are installed outside of a building or below grade, in a basement of the building.

Unlike the related art using multi-lines equal in number to the number of sectors, embodiments of the present invention may only use a single line to connect the distributor to slave modules 130, 132, and 134. Slave modules 130, 132, and 134 may be installed in each floor of building 108, preferably in places with the best reception sensitivity and ideal for call set-up with mobile stations. One sector signal is allocated to two floors, and this is easily implemented with distributor 120.

Figure 5:
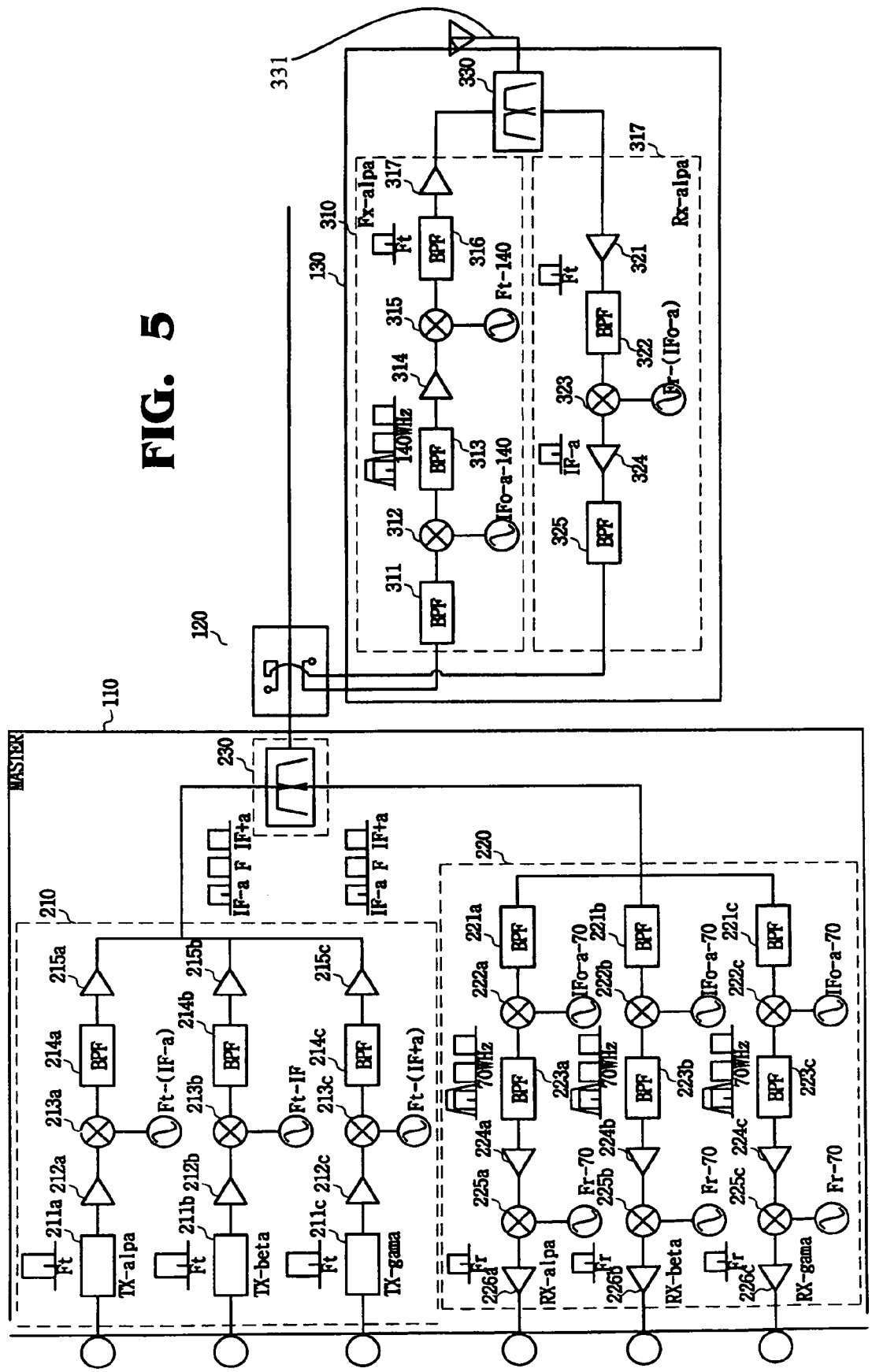
FIG. 5 is a detailed structure diagram of the 1-FA/3-sector IF in-building repeater illustrated by FIG. 4, constructed as one embodiment of the principles of the present invention.

FIG. 5 is a detailed block diagram schematic illustrating an 1-FA/3-sector IF repeater system installed as an in-building repeater, constructed as one embodiment of the principles of the present invention.

As depicted in FIG. 5, master module 110 includes master transmitting unit 210, master receiving unit 220, and master transmitting/receiving separator 203 for separating transmitted/received signals of master transmitting unit 210 from transmitted/received signals of the master receiving unit 220; separator 230 is hereafter referred to as a master duplexer 230. Slave module 130 includes slave transmitting unit 310, slave receiving unit 320, and slave duplexer 330.

Even though only one slave module 130 is detailed here, the other slave modules may have the same configuration.

Master transmitting unit 210 includes three parallel arrangements of serial connections formed by attenuators 211a, 211b, and 211c for attenuating received sector signals of 1-FA/3-sectors, first amplifiers 212a, 212b, and 212c, and mixers 213a, 213b, and 213c, band-pass filters 214a, 214b, and 214c, and second amplifiers 215a, 215b, and 215c, respectively.

Master receiving unit 220 includes three parallel arrangements of serial connections. formed by first band-pass filters 221a, 221b, and 221c for filtering other frequency signals than frequency bands used in received signals, first mixers 222a, 222b, and 222c, second band-pass filters 223a, 223b, and 223c, first amplifiers 224a, 224b, 224c, second mixers 225a, 225b, and 225c, and second amplifiers 226a, 226b, and 226c, respectively.

Slave transmitting unit 310 includes serial connection of a first band-pass filter 311, first mixer 312, second band-pass filter 313, first amplifier 314, second mixer 315, third band-pass filter 316, and power amplifier 317.

Slave receiving unit 320 includes a serial connection of a first amplifier 321, first band-pass filter 322, mixer 323, second amplifier 324, and second band-pass filter 325.

Described now are operations of master transmitting unit 210, master receiving unit 220, slave transmitting unit 310, and slave receiving unit 320.

First of all, each of the attenuators 211a, 211b, and 211c in master transmitting unit 210 receives 1-FA/3-sector frequency signals from a BTS (base transceiver station), attenuates the received signals, and provides the attenuated signals to first amplifiers 212a, 212b, and 212c.

First amplifiers 212a, 212b, and 212c amplify the attenuated 1-FA/3-sector frequency signals from respective attenuators 211a, 211b, and 211c, and mixers 213a, 213b, and 213c convert the signals into first intermediate frequency band signals and output the converted signals.

Particularly, mixer 213a for processing α-sector signals does not mix the first intermediate frequency signals, Ft-IF, with the α-sector signals received from amplifier 212a, but mixes the remaining signals (Ft-(IF-a)) after subtracting a first predetermined frequency signal, a, from the first intermediate frequency signal, IF, with the α-sector signals, and outputs the resulting signals.

Therefore, the mean frequency of the output signal from mixer 213a is shifted to the left on the inset two-coordinate graph of signal amplitude plotted as a function of frequency, from the first intermediate frequency signal, (Ft-IF), by a predetermined frequency.

Band-pass filter 214a serially coupled to the output terminal of mixer 213a, attenuates unnecessary signals in the output frequency components from mixer 213a, and passes a desired bandpass frequency.

Also, mixer 213b for processing β-sector signals mixes the first intermediate frequency signal, (Ft-IF), with the β-sector signals and outputs the resulting mixed signals.

In other words, output signals of mixer 213b has a mean frequency in the first intermediate frequency band, and band-pass filter 214b serially coupled to the output terminal of mixer 213b attenuates unnecessary signals in the output frequency components of mixer 213b, and passes a desired bandpass frequency.

In like manner, mixer 213c for processing γ-sector signals does not mix the first intermediate frequency signal, IF, with the γ-sector signals, but mixes the signals, (Ft-(IF+a)), after adding the first predetermined frequency signal, a, to the first intermediate frequency signal, (Ft-IF), with the γ-sector signals, and outputs the resulting mixed signals.

Therefore, the output signal of the mixer 213c is shifted to the right on a two-coordinate graph of signal amplitude plotted as a function of frequency, from the first intermediate frequency, (Ft-IF), by a predetermined frequency signal.

Band-pass filter 214c coupled to the output terminal of mixer 213c, attenuates unnecessary signals in the output frequency components of mixer 213c, and passes a desired bandpass frequency.

The α-, β-, and γ-sector signals having been output from each of the three parallel arms via corresponding mixers 213a, 213b, and 213c and respectively passed through corresponding band-pass filters 214a, 214b, and 214c and shifted to the first intermediate frequency band; consequently, their frequency bands do not overlap with each other.

Hence the α-, β-, and γ-sector signals can be transmitted through a single transmission line, and each of the α-, β-, and γ-sector signals may be amplified at the second amplifiers 215a, 215b, and 215c, respectively, and output on the same line.

Meanwhile, signals being generated at the master transmitting unit 210 of the master module 110 are passed through duplexer 230 and distributor 120, and are transmitted to slave transmitting unit 310.

For instance, slave transmitting unit 310 using the α-sector signals first attenuates the other signals besides the α-, β-, and γ-sector signals using first band-pass filter 311, and outputs frequency signals including the α-, β-, and γ-sector signals to the first mixer 312.

Then, first mixer 312 mixes a frequency, $(If_o\text{-a-140})$ having removed the first and second predetermined frequencies from the first intermediate frequency, in order to remove the β- and γ-sector signals besides the α-sector signals, and the outputs the resulting frequency at its output terminal. The second predetermined frequency becomes the mean frequency of the α-sector signals having passed through the mixer 312.

First band-pass filter 313 attenuates the β- and γ-sector signals except for the α-sector signals, and second amplifier 314 amplifies the α-sector signals without the β- and γ-sector signals and outputs the amplified α-sector signals to second mixer 315.

Second mixer 315 mixes FAs for use in mobile communication by restoring original high frequency signals, the FAs having been subtracted by the second predetermined value, $(If_o\text{-a-140})$, and restores the first intermediate frequency band signals to high frequency signals.

Second band-pass filter 316 attenuates noise in the signals from the output terminal of mixer 315, and power amplifier 317 amplifies these signals. Then, the amplified signals are passed through duplexer 330 and are output through an antenna 331.

Output signals for the mobile station are received by antenna 331 and duplexer 330. Duplexer 330 conducts the signals received through antenna 331 to first amplifier 321 in slave receiving unit 320. First amplifier 321 in slave receiving unit 320 amplifies the received signals to a certain level and provides the amplified signals to first band-pass filter 322.

First band-pass filter 322 performs band-pass filtering on the amplified signals output by first amplifier 321, and outputs the resulting signals to mixer 323.

Mixer 323 mixes the resulting signals from first band-pass filter 322 with frequency signals (Fr-(IFO-a)) to obtain signals that are shifted to the left of second intermediate frequency by the first predetermined frequency, and outputs the mixed signals to the second band-pass filter 325 via second amplifier 324.

Second band-pass filter 325 attenuates unnecessary signals in the amplified output frequency components received from second amplifier 324 and passes a desired frequency to a transmission line.

The signals transmitted through the transmission line are received by master receiving unit 220, and each sector signal processing unit therein filters out the other sector signals, leaving only its own sector signals.

To explain first about the α-sector signal processing procedure performed by master receiving unit 200, first band-pass filter 221a attenuates the remaining noise besides the α-, β-, and γ-sector signals being shifted to the second intermediate frequency band, and outputs the filtered signals to first mixer 222a.

First mixer 222a, extracts the α-sector signals, mixes signals, $((If_o\text{-a-70}))$, having subtracted the first and third predetermined values from the second intermediate frequency, and outputs the mixed signals to the input port of second band-pass filter 223a.

Second band-pass filter 223a passes only the α-sector signals being shifted to the third predetermined value, and attenuates the remaining signal components.

First amplifier 224a amplifies the filtered signals output by second band-pass filter 223a to a certain level, and outputs the amplified signals to the input terminal of second mixer 225a.

Second mixer 225a mixes output signals received from first amplifier 224a with the signals, (Fa-70), from which has been subtracted the third predetermined value, 70 mega-Hertz, from the FA used in the mobile communication service, and outputs the mixed signals to second amplifier 226a. In other words, second mixer 225a converts low frequency signals having been amplified by first amplifier 224a into high frequency signals, and outputs those high frequency signals to the second amplifier 226a.

Second amplifier 226a then amplifies the high frequency signals from second mixer 225a to a certain level, and transmits the amplified high frequency signals to a BTS or repeater, through antennas.

Turning now to how the β-sector signals are processed, first band-pass filter 221b attenuates the remaining noise, leaving only the α-, β-, and γ-sector signals shifted to the second intermediate frequency band, and outputs the filtered signals to the input terminal of first mixer 222b.

First mixer 222b extracts the β-sector signals, mixes signals, $(If_o\text{-a-70})$, obtained by subtracting the third predetermined value from the second intermediate frequency, and outputs the mixed signals to the input terminal of second band-pass filter 223b.

Second band-pass filter 223b filters off the remaining signals except for the β-sector signals being shifted to the third predetermined value of 70 mega-Hertz.

First amplifier 224b which is coupled to the output terminal of mixer of filter 223b, amplifies the filtered signals and outputs the amplified signals to the input terminal of second mixer 225b.

Second mixer 225b converts low frequency signals into high frequency signals by mixing the amplified signals output by first amplifier 224b with the signals, (Fr-70), obtained by subtracting the third predetermined value of 70 mega-Hertz from the FA used in the mobile communication service, and outputs the high frequency signals to the input port of second amplifier 226b.

Second amplifier 226b then amplifies the high frequency signals received from second mixer 225b to a certain level, and transmits the amplified high frequency signals to a BTS or repeater through antennas.

In like manner, to explain how the γ-sector signals are processed, the first band-pass filter 221c attenuates the remaining noise, leaving only the α-, β-, and γ-sector signals being shifted to the second intermediate frequency band, and outputs the filtered signals.

First mixer 222c extracts the γ-sector signals by mixing signals, $(If_o\text{-a-70})$, obtained by subtracting the first, a, and third 70 mega-Hertz predetermined values from the second intermediate frequency, $IF_o$, and outputs the mixed signals to the input port of second band-pass filter 223c.

Second band-pass filter 223c attenuates the remaining signals except for the γ-sector signals which have been shifted by the third predetermined value, 70 mega-Hertz.

First amplifier 224c amplifies the filtered signals and outputs the amplified signals to the input terminal of second mixer 225c.

Second mixer 225c mixes the signals amplified by the first amplifier 224c with the signals (Fr-70) obtained by subtracting the third predetermined value, 70 mega-Hertz, from the FA used in the mobile communication service, and outputs the mixed signals to the second amplifier 226c.

Second amplifier 226c then amplifies the high frequency signals received from second mixer 225c to a certain level, and transmits the amplified high frequency signals to a BTS or repeater through antennas.

Figure 6:
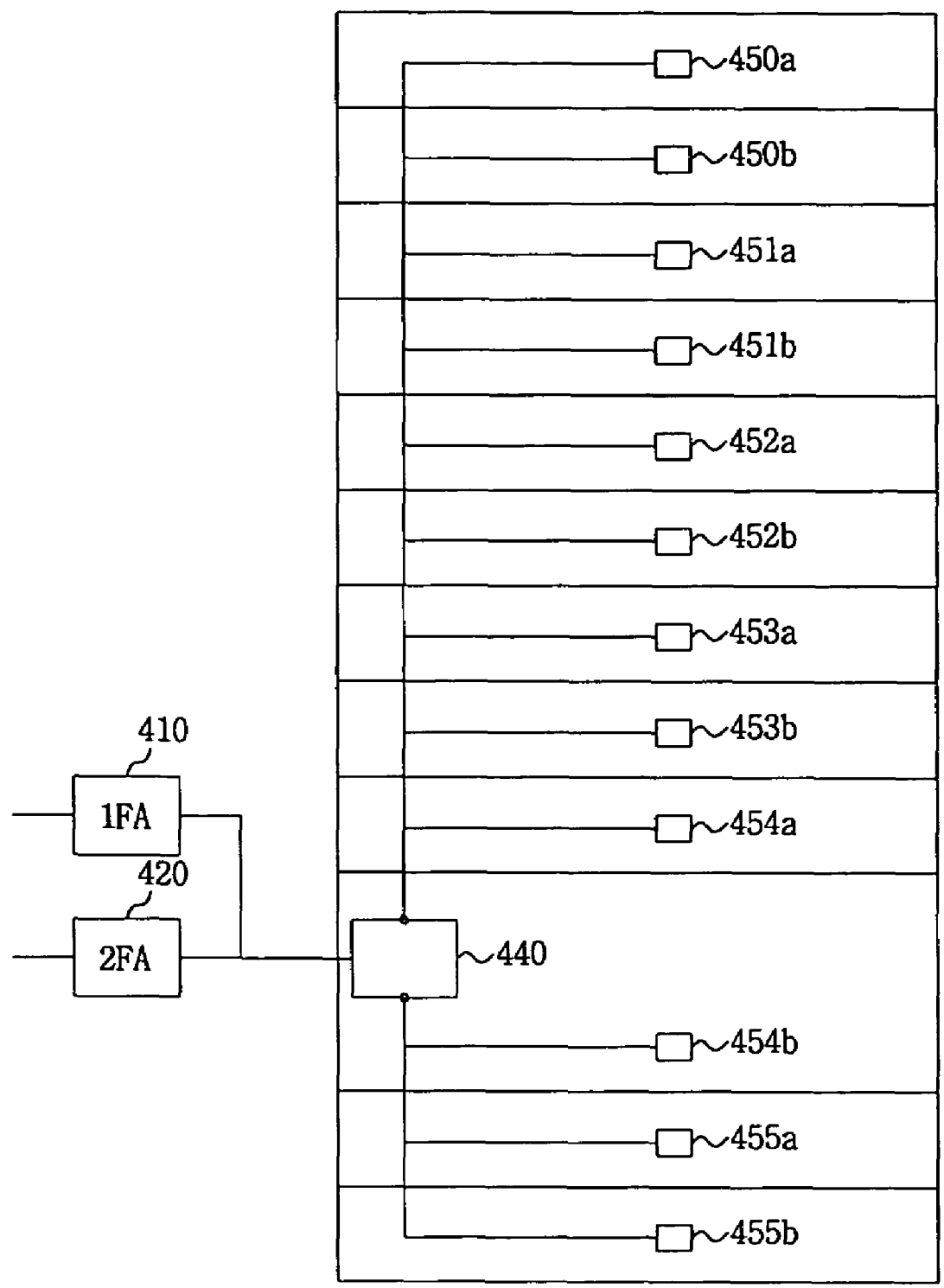
FIG. 6 is a detailed structure diagram of a 2-FA/3-sector IF repeater, constructed as an in-building repeater as another embodiment of the principles of the present invention.

FIG. 6 is a detailed structure diagram of a 2-FA/3-sector IF in-building repeater system constructed according to the principles of the present invention, as another embodiment. In brief, the masters modules 410, 420 convert any input signal to a lower intermediate frequency signal, which is transferred to the slave modules 450a . . . 455b. The slave modules then convert the intermediate frequency to a higher frequency again. The master modules are coupled respectively with the slave modules via coaxial cables.

As shown in FIG. 6, the 2-FA/3-sector in-building repeater system includes master modules 410 and 420 for receiving FA signals from a repeater, or BTS, respectively, mixing signals by adding or subtracting a predetermined frequency to or from an intermediate frequency in each of the sectors, and outputting the mixed signals to a distributor 440, and slave modules 450a through 455b in charge of two layers per one sector of 1 FA.

One thing to be careful of when implementing the 2-FA/3-sector for an in-building repeater system is that when shifting each signal after the signal has been converted into the intermediate frequency band, the signals in the 2 FA scheme should not overlap each other.

That is, the space between the intermediate frequency using 1 FA signals and the intermediate frequency using 2 FA signals should preferably be broad enough for signals not to overlap each other.

On the other hand, soft handoff technology used in the CDMA base personal communication systems can also be applied to the in-building repeater system by using one or two exclusive frequencies for a building, and by separating layers into multi-sectors.

The multi-sector in-building repeater system of the present invention can be applied not only to the interiors of building, but also to campus or radio blanket areas or to other places.

In conclusion, the multi-sector in-building repeater system of the present invention makes it possible to perform a soft handoff more naturally by using exclusive frequencies for a building and by separating inter layers into sectors.

Moreover, the present invention can be advantageously used for reducing construction costs using a single transmission line between master modules and slave modules, and installation thereof can be easily done.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A multi-sector in-building repeater in communication with a base station, the multi-sector in-building repeater comprising:
    a master transmitting unit for receiving multi-sector signals of a carrier frequency from the base station, mixing the multi-sector signals with different transmission intermediate frequency signals, and outputting the mixed multi-sector signals to a same transmission line;
    a plurality of slave transmitting units, each of which receives the mixed multi-sector signals, for extracting from the mixed multi-sector signals sector signals assigned to the multi-sector signals from the transmission line, converting the extracted sector signals into high frequency signals, and transmitting the high frequency signals through an antenna;
    a plurality of slave receiving units for mixing different receiving intermediate frequency signals with sector signals of carrier frequencies received from the antenna, converting the mixed signals into multi-sector signals of different receiving intermediate frequency bands, and outputting the converted signals to the same transmission line;
    a master receiving unit for mixing the multi-sector signals received from the plurality of slave receiving units, the multi-sector signals having been transmitted through the same transmission line from the plurality of slave receiving units and converted into different receiving intermediate frequency band signals, with different intermediate frequency band signals, separating each of the mixed multi-sector signals, converting the separated multi-sector signals into receiving carrier frequency signals, and outputting the converted signals to the base station;
    a master transmitting/receiving separator for separating transmitted/received signals of the master transmitting unit from transmitted/received signals of the master receiving unit; and
    a distributor for distributing the mixed multi-sector signals received from the master transmitting unit to the plurality of slave transmitting units, receiving the multi-sector signals of different receiving intermediate frequency bands provided from the plurality of slave receiving units, and transmitting the multi-sector signals of different receiving intermediate frequency bands to the master receiving unit.

2. The repeater according to claim 1, wherein the master transmitting unit comprises:
    a plurality of mixing units for receiving the multi-sector signals of the carrier frequency from the base station, mixing the received multi-sector signals with the different transmission intermediate frequency signals, and outputting the mixed signals; and
    a plurality of amplifying units for filtering off unnecessary signals from the output signals of the mixing units, for amplifying the filtered signals without the unnecessary signals to a predetermined level, and for outputting the amplified signals to the same transmission line.

3. The repeater according to claim 2, wherein each of the mixing units comprises:
    an attenuator for receiving the multi-sector signals of the carrier frequency received from the base station, attenuating the received multi-sector signals, and outputting the attenuated multi-sector signals; and
    a mixer for mixing the attenuated multi-sector signals provided from the attenuator with signals having frequency values equal subtraction results of different transmission intermediate frequency band signals from the carrier frequency, and outputting the mixed multi-sector signals into the different transmission intermediate frequency band signals to each of the amplifying units.

4. The repeater according to claim 2, wherein each of the amplifying units comprises:
   a bandpass filter for filtering off the mixed multi-sector signals into different transmission intermediate frequency band signals provided from the mixing units; and
   an amplifier for amplifying the filtered signals received from the band-pass filter to a predetermined level, and outputting the amplified signals to the transmission line.

5. The repeater according to claim 1, wherein the slave transmitting unit comprises:
   a sector signal extracting unit for extracting different transmission intermediate frequency band signals from the mixed multi-sector signals provided from the master transmitting unit, mixing the different transmission intermediate frequency band signals into sector signals to be extracted out of the mixed multi-sector signals with signals having frequency values equal subtraction results of a predetermined value from the transmission intermediate frequency signals, and extracting the sector signals; and
   a high frequency signal generating unit for converting the extracted sector signals received from the sector signal extracting unit into the high frequency signals, and transmitting the converted signals through the antenna.

6. The repeater according to claim 5, wherein the sector signal extracting unit comprises:
   a first band-pass filter for filtering off the multi-sector signals having been converted into the different transmission intermediate frequency band signals provided from the master transmitting unit;
   a mixer for receiving the filtered multi-sector signals from the first band-pass filter, mixing the filtered multi-sector signals into sector signals to be extracted out of the multi-sector signals with signals having frequency values equal subtraction results of the predetermined value from the transmission intermediate frequency signals, and outputting the mixed signals; and
   a second band-pass filter for filtering off the output signals of the mixer, and extracting a desired sector signal.

7. The repeater according to claim 5, wherein the high frequency signal generating unit comprises:
   a high frequency generator for generating the high frequency signals by mixing the sector signals extracted through the sector signal extracting unit with signals having frequency values equal subtraction results of a predetermined value from the carrier frequency; and
   a power amplifier for amplifying power of the high frequency signals provided by the high frequency generator, and transmitting the amplified signals through the antenna.

8. The repeater according to claim 1, wherein the slave receiving unit comprises:
   an intermediate frequency generating unit for generating intermediate frequency signals by mixing the received sector signals of carrier frequencies provided through the antenna with the assigned receiving intermediate frequency signals; and
   an amplifier for filtering off the intermediate frequency signals generated by the intermediate frequency generating unit, and amplifying the filtered intermediate frequency signals to a predetermined level.

9. The repeater according to claim 8, wherein the intermediate frequency generating unit comprises:
   an amplifier for amplifying the received sector signals of carrier frequencies provided through the antenna to a predetermined level;
   a band-pass filter for filtering the received sector signals of carrier frequencies being amplified by the amplifier; and
   a mixer for mixing filtered sector signals of carrier frequencies provided from the band-pass filter with signals having frequency values equal the intermediate frequency signals from a receive carrier frequency.

10. The repeater according to claim 8, wherein the amplifying unit comprises:
    an amplifier for amplifying the intermediate frequency signals provided by the intermediate frequency generating unit to a predetermined level; and
    a band-pass filter for filtering off the amplified intermediate frequency signals from the amplifier, and transmitting the filtered signals to the master receiving unit.

11. The repeater according to claim 1, wherein the master receiving unit comprises:
    a plurality of sector signal separating units for extracting the multi-sector signals into the different receiving intermediate frequency band signals provided from the plurality of slave receiving units, mixing the receiving intermediate frequency band signals into sector signals to be extracted with signals having frequency values equal subtraction results of a predetermined value from the mixed receiving intermediate frequency band signals, and separating the sector signals to be extracted; and
    a plurality of high frequency generating units for receiving the separated sector signals from the sector signal separating unit, mixing the separated sector signals into receive intermediate frequency band signals with signals having frequency value equal subtraction results of a predetermined value from a receive carrier frequency, converting the receive intermediate frequency band signals to the receiving carrier frequency signals, and outputting the converted signals to the base station.

12. The repeater according to claim 11, wherein the sector signal separating unit comprises:
    a mixer for extracting the multi-sector signals into the different receiving intermediate frequency band signals provided from the plurality of slave receiving units, for mixing the receiving intermediate frequency band signals into sector signals to be extracted with signals having frequency values equal subtraction results of a predetermined value from the receiving intermediate frequency signals, and outputting mixed signals; and
    a band-pass filter for receiving the mixed signals from the mixer, performing band-pass filtering the mixed signal around the predetermined value into the sector signals, and separating the sector signals to be extracted.

13. The repeater according to claim 11, wherein the high frequency generating unit comprises:
    a mixer for receiving the separated sector signals from the sector signal separating unit, mixing the sector signals into receive intermediate frequency band signals with frequency signals having frequency values equal subtraction results of a predetermined value from a receive carrier frequency, converting the receive intermediate frequency band signals to the receiving carrier frequency band signals, and outputting converted signals;

and an amplifier for amplifying the receiving carrier frequency band signals output from the mixer to a predetermined level.

14. Apparatus for transmitting sector signals in a multi-sector in-building repeater, the apparatus comprising:
a master transmitting unit for receiving multi-sector signals of a carrier frequency from a base station, mixing the multi-sector signals with different transmission intermediate frequency signals, and outputting the mixed multi-sector signals to a same transmission line;
a plurality of slave transmitting units, each of which receives the mixed multi-sector signals, for extracting sector signals assigned to the multi-sector signals from the transmission line, converting the extracted sector signals into high frequency signals, and transmitting the high frequency signals through an antenna.

15. The apparatus according to claim 14, wherein the master transmitting unit comprises:
a plurality of mixing units for receiving the multi-sector signals of the carrier frequency from the base station, mixing the received multi-sector signals with the different transmission intermediate frequency signals, and outputting the mixed sector signals; and
a plurality of amplifying units for filtering off unnecessary signals from the mixed multi-sector signals outputted from the mixing units, for amplifying the filtered signals without the unnecessary signals to a predetermined level, and for outputting amplified signals to a same transmission line.

16. The apparatus according to claim 15, wherein each of the mixing units comprises:
an attenuator for extracting the multi-sector signals of the carrier frequency into high frequency sector signals of an assigned carrier frequency from the base station, attenuating the high frequency sector signals, and outputting the attenuated high frequency sector signals; and
a mixer for mixing the attenuated high frequency sector signals received from the attenuator with signals having frequency values equal subtraction results of the different transmission intermediate frequency band signals from the carrier frequency, and outputting the mixed signals into the different transmission intermediate frequency band signals to each of the amplifying units.

17. Apparatus for receiving sector signal in a multi-sector in-building repeater, the apparatus comprising:
a plurality of slave receiving units for mixing different receiving intermediate frequency signals with sector signals of carrier frequencies received from an antenna, converting the mixed signals into multi-sector signals of different receiving intermediate frequency bands, and outputting the converted signals to a same transmission line;
a master receiving unit for mixing the multi-sector signals provided from the plurality of slave receiving units, the multi-sector signals having been transmitted through the same transmission line from the plurality of slave receiving units and converted into different receiving intermediate frequency band signals, with different intermediate frequency band signals, separating each of the different intermediate frequency band signals, converting the separated signals into receiving carrier frequency signals, and outputting the converted signals to a base station;
a distributor for distributing received multi-sector signals to the plurality of slave transmitting units, receiving the multi-sector signals of different receiving intermediate frequency bands from the plurality of slave receiving units, and transmitting the multi-sector signals of different receiving intermediate frequency bands to the master receiving unit.

18. The apparatus according to claim 17, wherein the slave receiving unit comprises:
an intermediate frequency generating unit for generating intermediate frequency signals by mixing the sector signals of carrier frequencies provided through the antenna with the assigned receiving intermediate frequency signals; and
an amplifier for filtering off the intermediate frequency signals generated by the intermediate frequency generating unit, and amplifying the filtered intermediate frequency signals to a predetermined level.

19. The apparatus according to claim 18, wherein the intermediate frequency generating unit comprises:
an amplifier for amplifying the sector signals of carrier frequencies provided through the antenna to a predetermined level;
a band-pass filter for filtering the sector signals being amplified by the amplifier; and
a mixer for mixing the filtered sector signals provided from the band-pass filter with signals having frequency values equal subtraction results of the intermediate frequency signals from a receive carrier frequency.

20. A method of providing signals from a base station to multiple sectors in a building utilizing a multi-sector in-building repeater, comprising:
attenuating and amplifying a plurality of sector signals of a carrier frequency received from the base station;
mixing each of the attenuated and amplified sector signals with corresponding different transmission intermediate frequency signals, and outputting each of the mixed sector signals to a same transmission line via a first duplexer;
distributing the mixed sector signals received from the same transmission line to a plurality of slave transmitting units disposed at respective ones of the multiple sectors;
extracting sector signals in each of the multiple sectors from the mixed sector signals by utilizing different intermediate frequency signals assigned to respective ones of the slave transmitting units;
converting the extracted sector signals into high frequency signals, and transmitting the high frequency signals via a second duplexer through respective antennas, disposed within each of the multiple sectors.

21. The method as set forth in claim 20, further comprising:
generating, in each of a plurality of slave receiving units, intermediate frequency signals by mixing receive carrier frequency sector signals provided through the antenna and the second duplexer, with assigned receive intermediate frequency signals;
outputting the intermediate frequency signals of each slave receiving unit to said first duplexer via said same transmission line;
converting the intermediate frequency signals of each slave receiving unit, outputted by the first duplexer, to different carrier frequency signals for transmission to said base station.

* * * * *